(12) United States Patent
Osborn et al.

(10) Patent No.: US 9,400,005 B2
(45) Date of Patent: Jul. 26, 2016

(54) SELF-CLINCHING FASTENER

(71) Applicant: INFASTECH INTELLECTUAL PROPERTIES PTE. LTD, Singapore (SG)

(72) Inventors: Douglas Osborn, Decorah, IA (US); Cheng Siong Phua, Singapore (SG); Donald K. Blaess, Cresco, IA (US); Arnold Wang, Tainan (TW); Lionel Dayton, Decorah, IA (US)

(73) Assignee: Infastech Intellectual Property Pte. Ltd, Singapore (SG)

( * ) Notice: Subject to any disclaimer, the term of this patent is extended or adjusted under 35 U.S.C. 154(b) by 247 days.

(21) Appl. No.: 13/930,271

(22) Filed: Jun. 28, 2013

(65) Prior Publication Data

US 2014/0003883 A1 Jan. 2, 2014

Related U.S. Application Data

(60) Provisional application No. 61/666,383, filed on Jun. 29, 2012.

(51) Int. Cl.
| | |
|---|---|
| *F16B 39/28* | (2006.01) |
| *F16B 19/00* | (2006.01) |
| *F16B 37/06* | (2006.01) |

(52) U.S. Cl.
CPC ............... *F16B 19/00* (2013.01); *F16B 37/068* (2013.01)

(58) Field of Classification Search
CPC .............................. F16B 19/00; F16B 37/068
USPC .................................................. 411/107, 184
See application file for complete search history.

(56) References Cited

U.S. PATENT DOCUMENTS

D219,953 S  *  2/1971  Ernest ........................... D8/387
3,782,436 A       1/1974  Steiner
(Continued)

FOREIGN PATENT DOCUMENTS

WO          82/02579        8/1982

OTHER PUBLICATIONS

Peninsula Components, Rev.1: ST_NU_STUDS_014 (unknown date) p. 53.

(Continued)

*Primary Examiner* — Gary Estremsky
(74) *Attorney, Agent, or Firm* — Hahn, Loeser & Parks, LLP; Arland T. Stein; Brian V. Finch

(57) ABSTRACT

A self-clinching fastener suitable for connection to a member having a shank of a diameter less than a head portion, the head portion having at least eight lands extending outwardly along the underside of the head portion spaced about the shank, each land having a face surface extending beyond the shank to a diameter less than or equal to the radius of the head portion, the width of the lands reducing from adjacent the shank toward the radius of the head portion. The fastener further includes an axial annular engagement groove having a diameter larger than the shank, the annular engagement groove axially extending from the lands to a retaining collar adjacent the shank, the groove adapted to relieve material of a member on installation by receiving material as the lands in the underside of the head portion mechanically interlock with the member.

16 Claims, 10 Drawing Sheets

(56) References Cited

U.S. PATENT DOCUMENTS

| | | | | |
|---|---|---|---|---|
| 3,967,669 A | * | 7/1976 | Egner | 411/184 |
| 4,432,681 A | | 2/1984 | Capuano | |
| 4,543,023 A | | 9/1985 | Capuano | |
| 4,637,766 A | | 1/1987 | Milliser | |
| 4,812,095 A | * | 3/1989 | Piacenti | B21K 1/46 411/161 |
| 4,940,375 A | | 7/1990 | Marvell et al. | |
| 5,513,933 A | * | 5/1996 | Rom | B23P 19/062 29/432.2 |
| 5,743,691 A | * | 4/1998 | Donovan | 411/180 |
| 5,795,175 A | * | 8/1998 | Barr | 439/358 |
| 5,797,175 A | * | 8/1998 | Schneider | B23P 19/062 29/520 |
| 6,206,737 B1 | * | 3/2001 | Bonilla | H01R 4/304 411/188 |
| 6,491,487 B1 | * | 12/2002 | Wojciechowski | B23P 19/062 29/432.2 |
| 6,647,608 B2 | * | 11/2003 | Wojciechowski et al. | 29/515 |
| 6,817,815 B2 | * | 11/2004 | Ross | F16B 35/048 411/107 |
| 6,917,815 B2 | * | 7/2005 | Hajimiri et al. | 455/552.1 |
| 7,124,492 B2 | * | 10/2006 | Wojciechowski | B23P 19/062 29/509 |
| 7,866,929 B2 | * | 1/2011 | Babej et al. | 411/107 |
| 2006/0204348 A1 | * | 9/2006 | Shuart | 411/107 |
| 2008/0120825 A1 | | 5/2008 | Shuart et al. | |

OTHER PUBLICATIONS

International Search Report for PCT/2013/048509, Feb. 8, 2016.

* cited by examiner

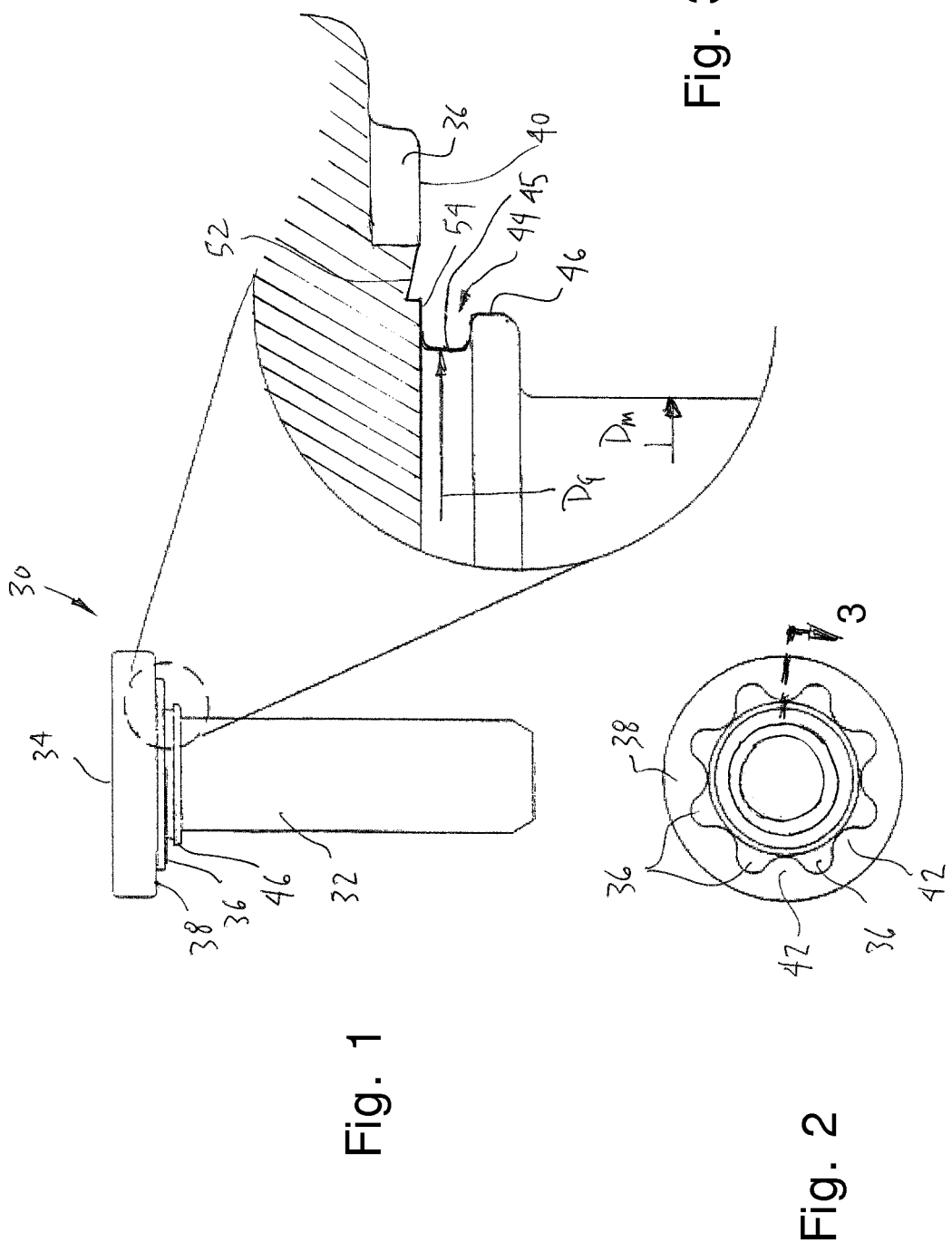

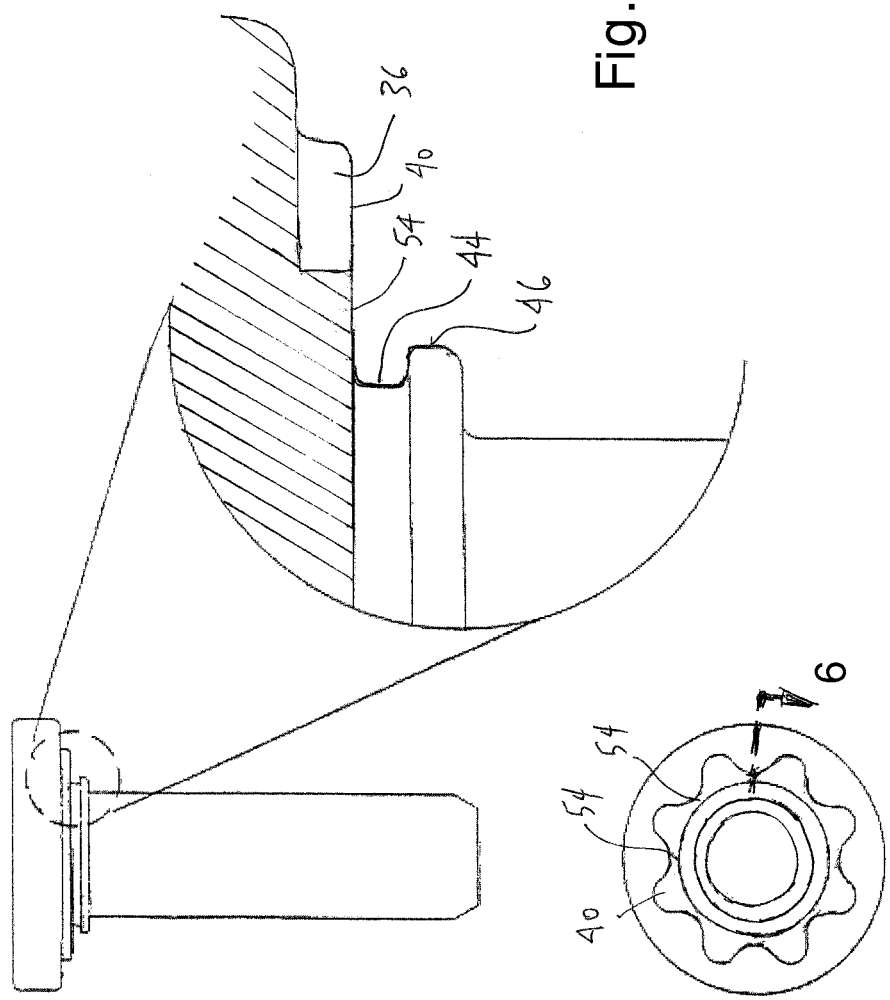

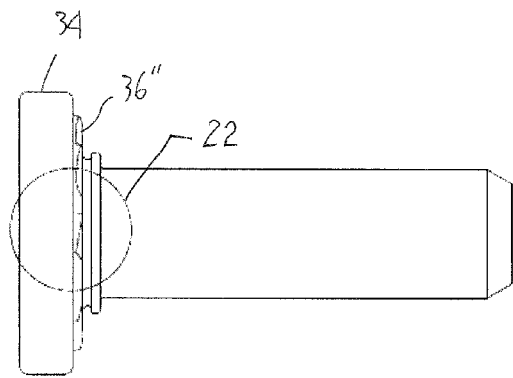
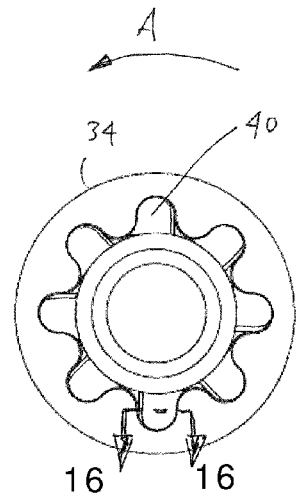
Fig. 20  Fig. 21
Fig. 22
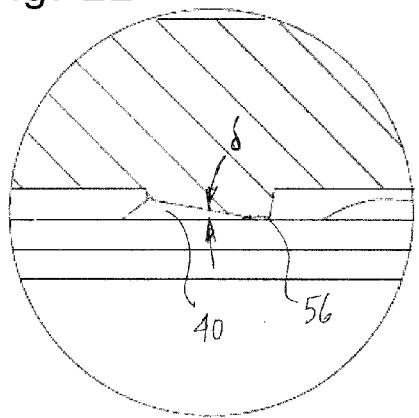
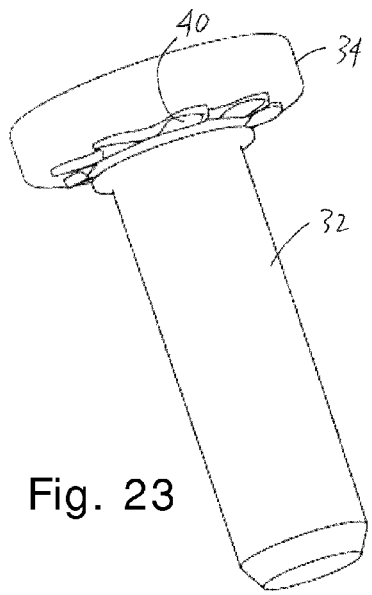
Fig. 23

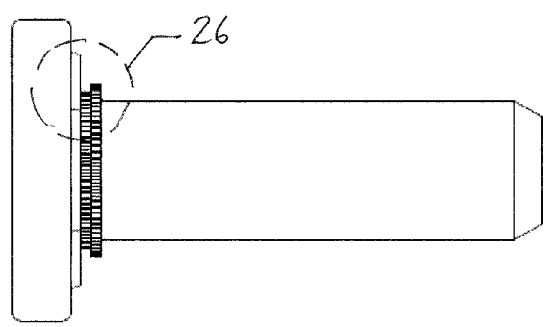
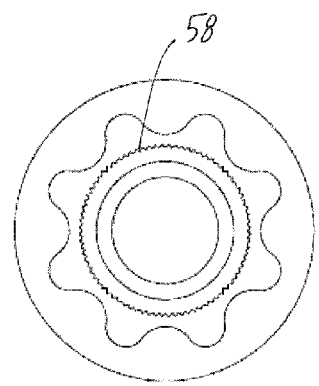
Fig. 24                Fig. 25
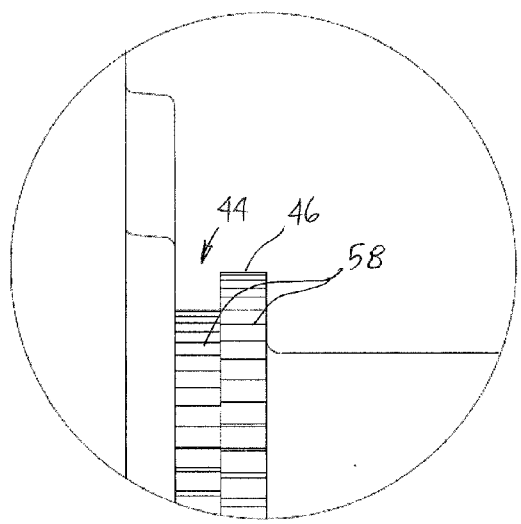
Fig. 26

SELF-CLINCHING FASTENER

This application claims priority to and the benefit of U.S. Provisional Patent Application No. 61/666,383 filed on Jun. 29, 2012, which is incorporated herein by reference.

BACKGROUND AND SUMMARY

The present invention relates to a self-clinching fastener that is pressable into a pre-formed hole in a component inhibiting rotation and press-out of the fastener installed in the component.

Self-clinching fasteners have been used in applications for which a fastener such as a nut, bolt, or a stud is desired to be connected to a sheet of material or other component. In certain applications, a self-clinching fastener may be pressed into a pre-formed hole in the sheet of material or other component. The fastener may include features such that the material of the component around the hole cold forms into an engagement with the fastener. However, prior self-clinching fasteners have been prone to falling out of the hole in the metal sheet when bumped or pressed by small incidental contact. This was particularly inefficient when the parts had to be moved to another location to re-install the fastener because a particular press was needed to re-install the fastener. In addition, certain prior fasteners would not consistently lock in place when installed in a metal sheet, enabling rotation of the fastener when a mating fastener was turned in engagement with the self-clinching fastener. Certain prior self-clinching fasteners could not consistently meet desired performance requirements. Rotation and press-out of prior self-clinching fasteners caused inefficiencies and increased cost in using such fasteners.

What is disclosed is a self-clinching fastener suitable for connection to a member having a shank portion of a diameter less than a head portion, the head portion having at least eight lands extending outwardly along the underside of the head portion spaced about the shank, each land having a face surface extending beyond the shank portion to a radius less than or equal to a radius of the head portion, the width of the lands reducing from adjacent the shank portion toward the radius of the head portion to mechanically interlock with a member with which the fastener is engaged when installed, and an axial annular engagement groove having a diameter larger than the shank portion, the annular engagement groove axially extending from the lands to a retaining collar adjacent the shank portion, the groove adapted to relieve material of a member on installation of the fastener by receiving material as the lands in the underside of the head portion mechanically interlock with the member.

The lands may extend to between 75% and 100% of the radius of the head portion. Alternatively, the lands may extend to between 78% and 85% of the radius of the head portion. In one alternative, the lands extend to between 90% and 100% of the radius of the head portion.

In addition, the fastener may include an annular recess on the underside of the head portion from an upper portion of the groove sloping into the head portion, and the face surface of the lands beyond the sloping annular recess being non-sloping adapted to assist in forming material into the groove as the fastener engages the member.

In one alternative, the land face surfaces are annularly angled to enable leading edge portions of the lands to initially contact material as the fastener engages the member.

The fastener may further include a plurality of partial threads along an inner portion of the groove between the retaining collar and the lands. Alternatively or additionally, edge portions of the groove and the retaining ring have serrations.

Also disclosed is a self-clinching fastener suitable for connection to a member having a shank portion of a diameter less than a head portion, the head portion having at least eight lands extending outwardly along the underside of the head portion spaced about the shank, each land having a face surface extending beyond the shank portion to a radius less than or equal to a radius of the head portion to mechanically interlock with a member with which the fastener is engaged when installed, each land having a leading edge extending toward the radius of the head portion angled from a radial plane, and an axial annular engagement groove having a diameter larger than the shank portion, the annular engagement groove axially extending from the lands to a retaining collar adjacent the shank portion, the groove adapted to relieve material of a member on installation of the fastener by receiving material as the lands in the underside of the head portion mechanically interlock with the member.

The shank portion may be threaded, and the leading edges of the lands are angled opposite the thread direction between 0 and 10 degrees.

The lands may extend to between 75% and 100% of the radius of the head portion. Alternatively, the lands may extend to between 78% and 85% of the radius of the head portion.

In addition, the fastener may include an annular recess on the underside of the head portion from an upper portion of the groove sloping into the head portion, and the face surface of the lands beyond the sloping annular surface being non-sloping adapted to assist in forming material into the groove as the fastener engages the member.

In one alternative, the land face surfaces are annularly angled to enable leading edge portions of the lands to initially contact material as the fastener engages the member.

The fastener may further include a plurality of partial threads along an inner portion of the groove between the retaining collar and the lands. Alternatively or additionally, edge portions of the groove and the retaining ring may have serrations.

In another alternative, a self-clinching fastener is disclosed suitable for connection to a member having a shank portion of a diameter less than a head portion, the head portion having at least eight lands extending outwardly along the underside of the head portion spaced about the shank, each land having a face surface extending beyond the shank portion to a diameter less than or equal to the radius of the head portion to mechanically interlock with a member with which the fastener is engaged when installed, each land face surface being annularly angled to enable portions of a leading edge of the lands to initially contact material as the fastener engages the member, and an axial annular engagement groove having a diameter larger than the shank portion, the annular engagement groove axially extending from the lands to a retaining collar adjacent the shank portion, the groove adapted to relieve material of a member on installation of the fastener by receiving material as the lands in the underside of the head portion mechanically interlock with the member. In certain alternatives, the face surface may be angled in the thread direction toward the face surface between 3 and 20 degrees.

In one alternative, each land has the leading edge extending toward the radius of the head portion angled from a radial plane. Where the shank portion is threaded, the leading edges of the lands may be angled opposite the thread direction between 0 and 10 degrees.

The lands may extend to between 75% and 100% of the radius of the head portion. Alternatively, the lands may extend to between 78% and 85% of the radius of the head portion.

In addition, the fastener may include an annular recess on the underside of the head portion from an upper portion of the groove sloping into the head portion, and the face surface of the lands beyond the sloping annular recess being non-sloping adapted to assist in forming material into the groove as the fastener engages the member.

In certain alternatives, the land face surfaces may be annularly angled to enable leading edge portions of the lands to initially contact material as the fastener engages the member.

The fastener may further include a plurality of partial threads along an inner portion of the groove between the retaining collar and the lands. Alternatively or additionally, edge portions of the groove and the retaining ring may have serrations as desired.

These and other features of the subject matter of the present application, as well as details of illustrated embodiments thereof, will be more fully understood from the following description and drawings.

BRIEF DESCRIPTION OF THE DRAWINGS

FIG. 1 is a side view of a self-clinching fastener of the present disclosure,

FIG. 2 is an end view of the fastener of FIG. 1,

FIG. 3 is a detail partial sectional view of the fastener of FIG. 1,

FIG. 4 is a side view of an alternative self-clinching fastener of the present disclosure, FIG. 5 is an end view of the fastener of FIG. 4, FIG. 6 is a detail partial sectional view of the fastener of FIG. 4, FIG. 20 is a side view of a seventh alternative self-clinching fastener of the present disclosure, FIG. 21 is an end view of the fastener of FIG. 20, FIG. 22 is a detail partial sectional view of the fastener of FIG. 20, FIG. 23 is a perspective view of the fastener of FIG. 20, FIG. 24 is a side view of an eighth alternative self-clinching fastener of the present disclosure, FIG. 25 is an end view of the fastener of FIG. 24, FIG. 26 is a detail view of the fastener of FIG. 24.

DETAILED DESCRIPTION OF THE DRAWINGS

Figure 7:
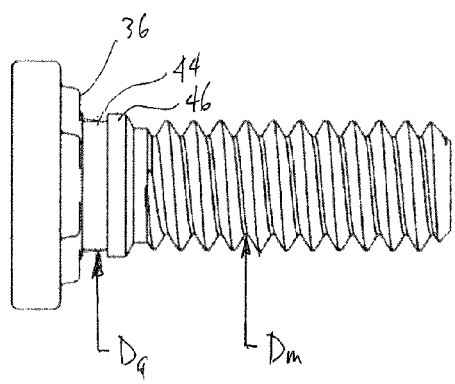
FIG. 7 is a side view of another alternative self-clinching fastener of the present disclosure.
Figure 8:
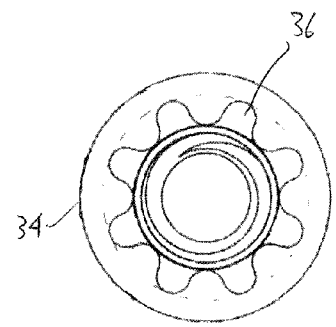
FIG. 8 is an end view of the fastener of FIG. 7.

Referring now to FIG. 1, a self-clinching fastener 30 for installation into a pre-formed hole in a component or member includes a shank portion 32 and a head portion 34 along a longitudinal axis. The shank portion 32 has a diameter less than the head portion 34. The head portion 34 includes at least eight lands 36 extending outwardly along the underside 38 of the head portion 34 and spaced about the shank 32 as shown in FIG. 2. Each land 36 has a face surface 40 extending beyond the shank portion 32 to a radius less than or equal to a radius of the head portion 34. As shown in FIG. 2, the lands 36 may be arcuate in shape. The lands extend toward the radius of the head portion, but do not have to be positioned on or along a radial line. The lands may extend on, along, offset from, or transverse to a radial plane as desired. The lands 36 are shaped to mechanically interlock with material of the member or component with which the fastener is engaged when installed. The lands 36 also project axially outwardly from the underside 38 of the head 34 providing a recessed area 42 in the underside 38 of the head between each pair of adjacent lands.

The head portion 34 may be circular in shape such as shown in FIG. 2. Alternatively, the head portion may be hexagonal, elliptical, square, or any other shape as desired. As used herein, the terms radius and radial are not limiting to a circular shape. As used herein, a radius is a straight-line dimension from the center of any shape to the outer edge of the shape.

As shown in FIG. 3, the fastener 30 includes an axial annular engagement groove 44 with an inner groove surface 45 having a diameter $D_G$ larger than a minor diameter $D_m$ of the shank portion. The annular engagement groove 44 is typically concentric about the shank. The groove 44 extends in the axial direction from the lands 36 to a retaining collar 46 adjacent the shank portion. The groove 44 is adapted to relieve material of the component or member, such as a metal sheet, on installation of the fastener by receiving material displaced as the lands in the underside of the head portion form the material of the member and mechanically interlock with the member or component as the fastener is pressed into the member or component. On installation, the material displaced by the lands in the underside of the head flows around the lands and into the groove 44 to interlock the fastener in the material. In certain alternatives, the inner groove surface 45 of the annular engagement groove 44 is positioned such that an upper surface of the groove joins a portion of the lands 36 adjacent the shank portion and a lower surface of the groove joins a portion of the retaining collar 46 adjacent the shank portion, the groove axially extending from the lands to the retaining collar.

The present fastener may include an annular surface 54 on the underside of the head portion between the shank 32 and the lands 36. As shown in FIG. 3, an annular recess 52 may be formed in the annular surface 54. The annular recess 52 may be positioned radially beyond the retaining collar 46 sloping into the head portion 34. In certain applications, the annular recess 52 may be positioned as desired between the inner groove surface 45 and the lands 36, particularly when the annular recess 52 is formed before the retaining collar 46 is formed when making the fastener. In the alternative shown in FIG. 3, the face surface 40 of the land beyond the annular recess 52 may be non-sloping. In an alternative shown in FIGS. 4-6, the annular groove 52 is not provided in the annular surface 54.

The lands 36 may extend outwardly along the underside of the head beginning from a radius that is the same as or larger than the radius of the inner groove surface 45, or the same as or larger than one half of $D_G$, particularly when the retaining collar is formed after the lands when making the fastener. Alternatively, the lands 36 may extend outwardly along the underside of the head beginning from a radius that is the same as or larger than the radius of the retaining collar 46. As shown in FIG. 2, the lands may extend outwardly from the annular recess 52, which may be outward of the retaining collar.

The present fastener 30 is installed into a pre-formed hole in a component or member, such as a sheet of metal or plastic for example, by passing the shank portion of the fastener through the pre-formed hole and pressing the lands 36 and underside 38 of the head 34 against the surface of the component or member. The fastener is forcibly pressed against the material of the member to embed the lands 34 into the material and engage and interlock the fastener with the material around the pre-formed hole. As used herein, the term member means the structure of a material, shape, or component that the present fastener may be installed into. The member may be a sheet of metal or plastic, or may be a portion of a component, or other structure into which the present fastener may be installed.

Typically, the lands are positioned evenly about the shank portion. In certain alternatives, the lands may be spaced in groups, or may be positioned at intervals that are not evenly spaced. The lands may be positioned around the shank in a symmetrical arrangement or an asymmetrical arrangement. The lands may extend along the underside of the head to between about 65% and 100% of the radius of the head portion. As shown in FIGS. 2 and 4, the lands may extend to between 75% and 85% of the radius of the head portion.

The distance between the lands 36 and/or annular surface 54 and the retaining collar 46 effects the width of the groove 44. The retaining collar 46 may be positioned spaced from the lands 36 a desired distance to accommodate the thickness of the material the fastener is designed to be installed. As shown in FIG. 7, the distance between the lands 36 and the retaining collar 46 may be increased as desired. As the fastener is pressed into a pre-formed hole in a sheet, for example, a portion of the sheet material around the hole cold forms and flows around the lands 36 and into the groove 44 above the retaining collar 46 as the lands 36 press into and imbed into the material.

The shank 32 may be threaded. Alternatively, the shank may be smooth, knurled, serrated, textured, or any other surface treatment as desired for the application.

Figure 9:
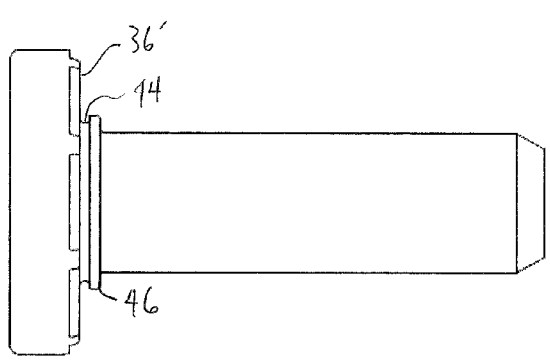
FIG. 9 is a side view of a yet another alternative self-clinching fastener of the present disclosure.
Figure 10:
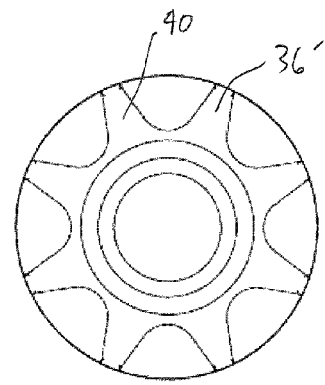
FIG. 10 is an end view of the fastener of FIG. 9.
Figure 11:
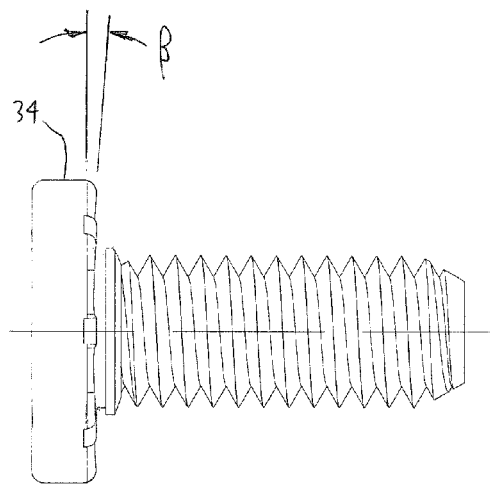
FIG. 11 is a side view of a fifth alternative clinching fastener of the present disclosure.
Figure 12:
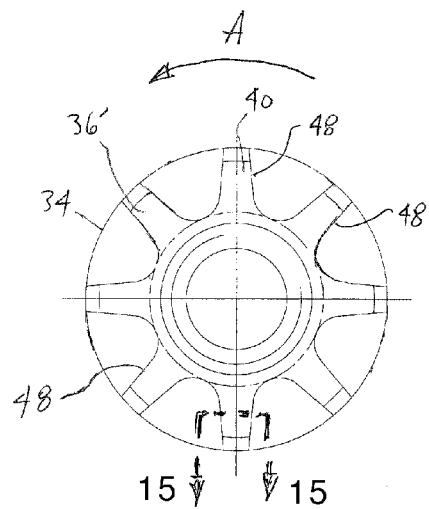
FIG. 12 is an end view of the fastener of FIG. 11.

The face surface 40 of each land 36 may be approximately parallel to a plane perpendicular to the shank portion. In one alternative, the face surface 40 of each land 36 are approximately in the same plane, such as shown in the alternatives of FIGS. 3, 5, 7, and 9. Alternatively, the face surface 40 of each land may slope away from the head portion as the land extends toward the outside diameter of the head as shown in FIG. 11. In the alternative shown in FIGS. 11 and 12, the face surface 40 of the lands 36' may slope away from the head portion by the angle β as the land extends toward the outside diameter of the head. The face surface may have an angle β between about 0° and 15°. In one alternative, the face surface may have an angle β between about 1° and 5°. The lands 36' may extend along the underside of the head to between about 65% and 100% of the radius of the head portion. As shown in FIGS. 10 and 12, the lands may extend to between 90% and 100% of the radius of the head portion.

The width of the lands 36' may reduce from adjacent the shank portion 32 toward the outer edge or the radius of the head portion 34 as shown in FIGS. 10 and 12. In certain alternatives, the width of the lands may taper toward the outer edge or radius of the head portion. Alternatively, the width of the lands 36' may increase from adjacent the shank portion 32 toward the outer edge or the radius of the head portion 34.

Figure 15:
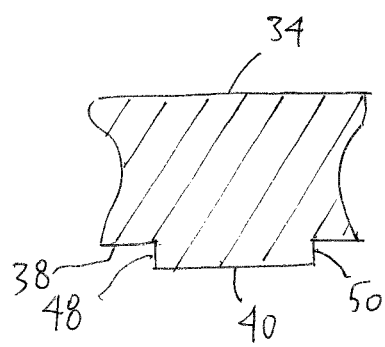
FIG. 15 is a partial sectional view through a head portion and land of the present disclosure taken from section 15-15 in FIG. 12.

Each land may have a rectangular cross section such as shown in FIG. 15. Each land 36 has a leading side 48 between the land face surface and the head portion resisting a rotational force of a nut or other corresponding part rotated about the shank portion 32 when the fastener 30 is installed, and a side 50 opposite the leading side 48. The leading side 48 faces the direction the fastener 30 would rotate under an applied rotational force in its application if it were free to rotate. For a threaded fastener, the leading side 48 opposes the thread direction, such as thread direction A shown in FIG. 12. The thread direction A shown in FIG. 12 is for a right-hand thread. Accordingly, the leading side 48 would be on the opposite side of side 48 in FIG. 12 when a left-hand thread is provided. In any event, the leading side 48 and/or the opposite side 50 may be approximately perpendicular from the underside 38 of the head such as shown in FIG. 15, or may have a draft angle between about 0.5° and 10°.

Samples of the present fastener were compared to competitive samples having 6 lobes or projections beneath the head. The test samples were M8×25 size fasteners installed into a 1.6 mm thick steel sheet having a hardness of 42.8 HRB. The fasteners were installed into drilled holes having diameters measured between 8.68 mm and 8.78 mm. Data from the comparison test is shown in TABLE 1. The present fastener was a 47% improvement in push-out force and 63% improvement in torque resistance over the competitive sample.

TABLE 1

| | M8 × 25 Push-out Force and Torque Resistance Test Comparison | | | | | | | | | | | |
|---|---|---|---|---|---|---|---|---|---|---|---|---|
| | Push-out Force (KN) | | | | | | Torque Resistance (N-m) | | | | | |
| | 1 | 2 | 3 | 4 | 5 | Avg. | 1 | 2 | 3 | 4 | 5 | Avg. |
| Present Invention | 2.88 | 2.90 | 2.84 | 2.79 | 2.89 | 2.86 | 41.7 | 46.1 | 47.1 | 47.1 | 46.1 | 45.6 |
| Competitive Sample | 1.87 | 1.92 | 1.81 | 1.96 | 2.14 | 1.94 | 32.4 | 27.5 | 27.0 | 27.5 | 25.0 | 27.9 |

Additional samples of the present invention were compared to competitive samples for push-out and torque resistance as shown in TABLE 2. The test samples were M6×25 size for the present invention and M6×14.5 for the competitive fasteners, both installed into a 1.6 mm thick steel sheet having a hardness of 34.4 HRB. The fasteners were installed into drilled holes having diameters measured between 6.68 mm and 6.78 mm. The competitive samples had 6 lobes under the head. The present invention provided a 20% improvement in push-out force over the competitive samples.

TABLE 2

M6 Push-out Force and Torque Resistance Test Comparison

| | Test | | | | | | | | | | | |
|---|---|---|---|---|---|---|---|---|---|---|---|---|
| | Push-out Force (KN) | | | | | | Torque Resistance (N-m) | | | | | |
| | 1 | 2 | 3 | 4 | 5 | Avg. | 1 | 2 | 3 | 4 | 5 | Avg. |
| Present Invention | 3.70 | 3.64 | 3.52 | 3.47 | 3.53 | 3.57 | 19.6 | 19.6 | 17.7 | 19.6 | 18.6 | 19.0 |
| Competitive Sample | 2.98 | 2.90 | 3.13 | 3.02 | 2.87 | 2.98 | 18.1 | 17.7 | 18.1 | 17.7 | 18.1 | 17.9 |

Additional configurations of the present clinching fastener are disclosed. As shown in FIGS. 9 and 10, the face surface 40 may extend from the shank portion 32 to between about 90% to 100% of the radius of the head portion 34 in approximately the same plane. Alternatively, the lands may extend to between about 65% to 100% of the radius of the head portion 34 in approximately the same plane.

Figure 13:
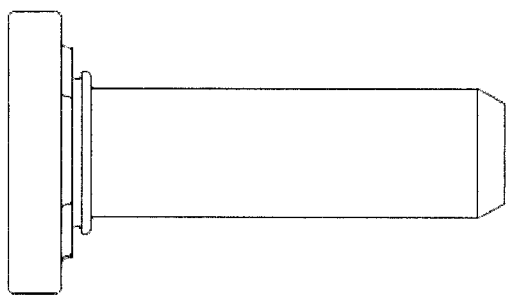
FIG. 13 is a side view of a sixth alternative self-clinching fastener of the present disclosure.
Figure 14:
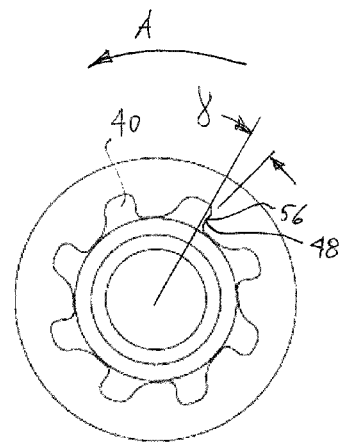
FIG. 14 is an end view of the fastener of FIG. 13.

In certain applications, particularly seeking resistance to fastener rotation under higher torque application, the lands may be shaped such that each land has a leading edge 56 extending toward the radius of the head portion angled (angle γ) from a radial plane such as shown in FIGS. 13 and 14. The leading edge 56 is the outer edge along the leading side 48 and the face surface 40. As discussed above, the leading side 48 faces the direction the fastener 30 would rotate under an applied rotational force in its application if it were free to rotate. As shown in FIG. 14, for a threaded fastener, the leading side 48 opposes the thread direction, such as thread direction A shown in FIG. 14 (right-hand thread). The leading edges 56 of the lands are angled opposite the thread direction by an angle γ between 0 and 10 degrees. Stated another way, the leading edges 56 of the lands are angled toward the direction of fastener rotation by an angle γ between 0 and 10 degrees. In certain alternatives, the leading edge 56 and leading side 48 extend along a radial plane. In yet another application, the leading edges 56 of the lands may be angled toward the thread direction by an angle γ between 0 and 10 degrees.

Figure 18:
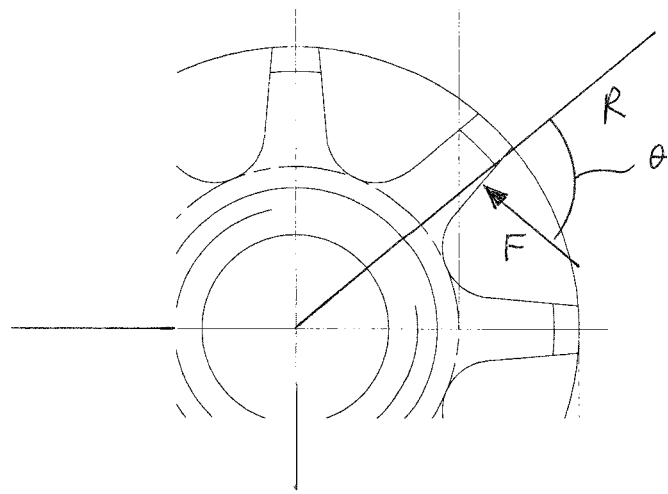
FIG. 18 is a partial end view of a fastener of the present disclosure showing the direction of an applied force on the fastener.
Figure 19:
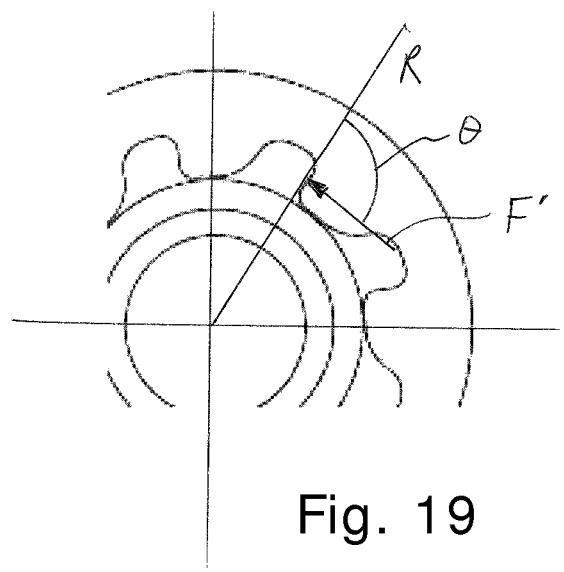
FIG. 19 is a partial end view showing an alternative direction of an applied force on the fastener.

The direction of an applied rotational force is shown schematically for illustration in FIGS. 18 and 19. In the example of FIG. 18, the applied rotational force F approximately perpendicular to the leading side 48 forms an angle θ of about 90° or less than 90° to a radial plane R. As shown in FIG. 19, when the leading side 48 is angled opposite the thread direction, the applied rotational force F' approximately perpendicular to the leading side 48 forms an angle θ greater than or equal to 90° to the radial plane R providing improved resistance to rotation.

Figure 16:
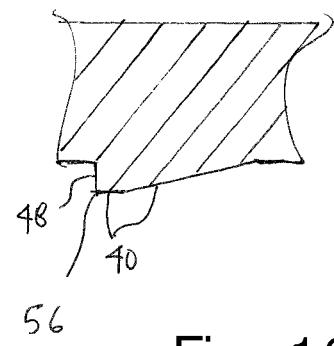
FIG. 16 is a partial sectional view through a head portion and an alternative radial land of the present disclosure taken from section 16-16 in FIG. 21.
Figure 17:
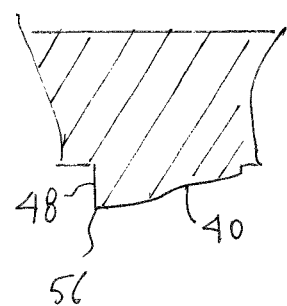
FIG. 17 is a partial sectional view through a head portion and another alternative radial land of the present disclosure taken from section 16-16 in FIG. 21.

In the alternative shown in FIGS. 20-23, the face surfaces 40 of the lands 36" are annularly angled to enable the leading edge portions 56 of the lands to initially contact material as the fastener engages the member or component on installation. As shown in FIGS. 16 and 22, the face surface is angled in the thread direction toward the head portion from the leading edge 56. The face surface may be angled in the thread direction toward the head portion by angle δ between 3 and 20 degrees. Alternatively, as shown in FIG. 17, the face surface 40 may include an arcuate surface, a radiused surface, a compound curved surface, or other surface shape developed to improve flow of material along the face surface and reduce the pressing force required to install the fastener.

Edge portions of the groove and the retaining ring may be knurled or have serrations 58 as shown in FIGS. 24-26. The serrations 58 engage material that flows into the groove 44 on installation to improve the interlock of the fastener with the installed member or component.

Figure 27:
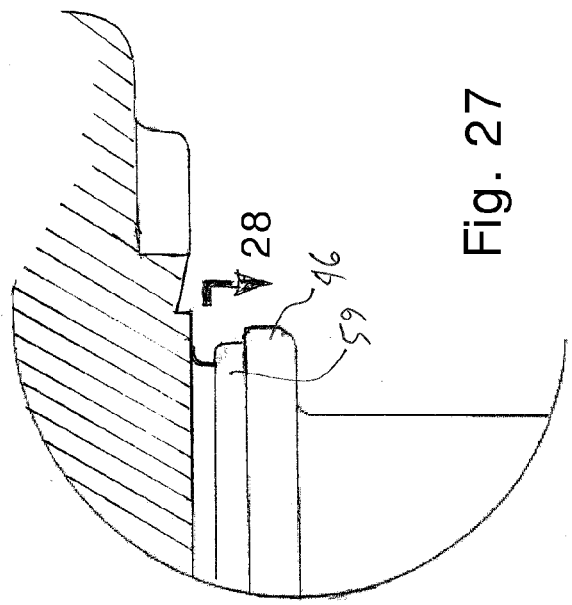
FIG. 27 is a partial sectional view of a ninth alternative self-clinching fastener of the present disclosure.
Figure 28:
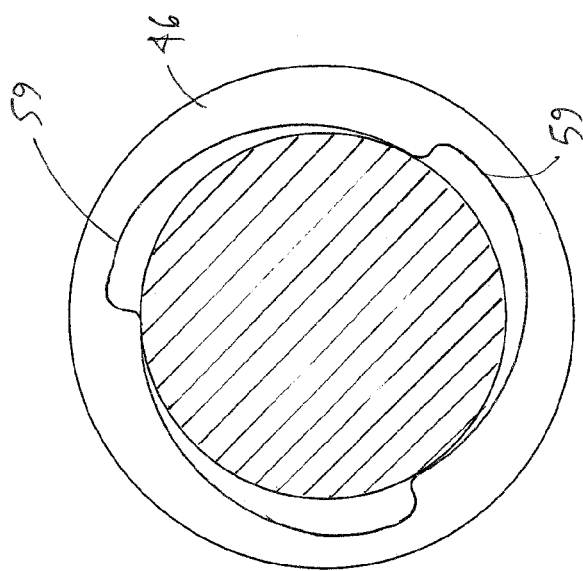
FIG. 28 is a sectional view of the fastener of FIG. 27.
Figure 29:
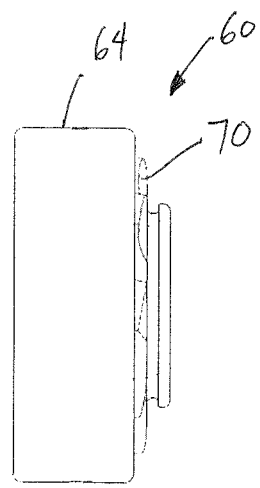
FIG. 29 is a side view of a nut of the present disclosure.

In an alternative shown in FIGS. 27 and 28, a plurality of partial threads 59 may be positioned along an inner portion of the groove between the retaining collar and the lands The partial threads 59 may be formed above the retaining collar 46 in the groove 44. The partial threads 59 may be formed to engage material that flows into the groove 44 on installation to improve the interlock of the fastener with the installed member or component. As shown in FIG. 28, three partial threads 59 may be provided. Alternatively, two or more partial threads 59 may be provided. In various alternatives, between 2 and 10 partial threads 59 may be provided between the retaining collar 46 and the lands 34 in the groove 44.

Figure 30:
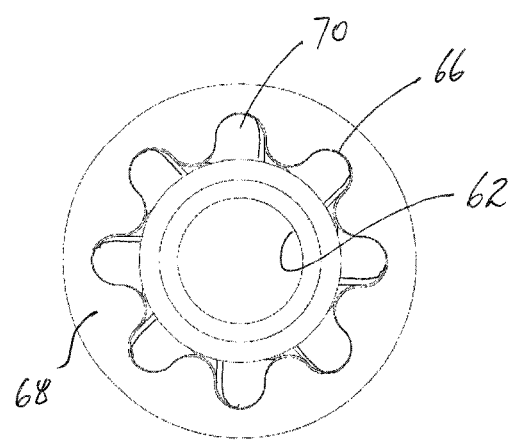
FIG. 30 is an end view of the nut of FIG. 29.
Figure 31:
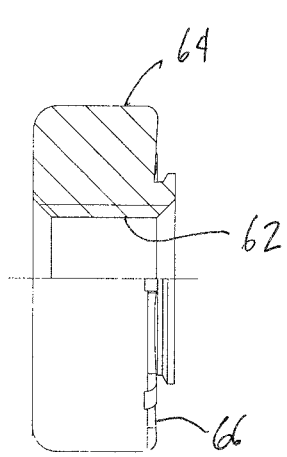
FIG. 31 is a partial cross-sectional side view of an alternative nut of the present disclosure.
Figure 32:
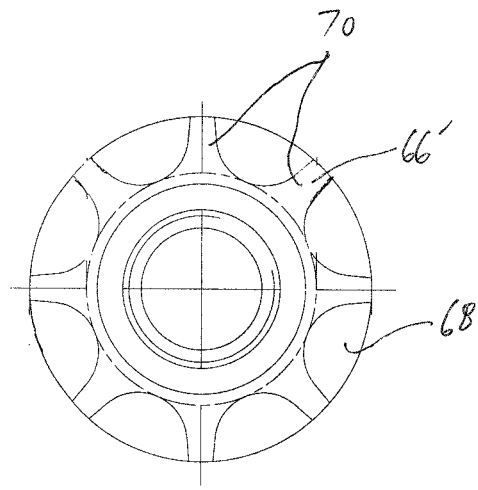
FIG. 32 is an end view of the nut of FIG. 31.

The present self-clinching fastener retaining features shown and described with reference to FIGS. 1-28 may be applied to a self-clinching nut as shown in FIGS. 29-32. The nut 60 includes a head portion 64 having at least eight lands 66 extending outwardly along the underside 68 of the head portion 64 spaced about an internally threaded nut aperture 62. Each land 66 has a face surface 70 extending to a radius less than or equal to the radius of the head portion. The lands 66 may be arcuate in shape as shown in FIG. 30 extending from the shank portion to between about 65% and 90% of the radius of the head portion. Alternatively, the lands may extend to between about 75% and 85% of the radius of the head portion. Alternatively, as shown in FIG. 32, the width of the lands 66' may reduce toward the radius of the head portion to mechanically interlock with a member with which the fastener is engaged when installed. In certain alternatives, the width of the lands may taper toward the radius of the head portion. The lands 66' may extend to between about 65% and 100% of the radius of the head portion. As shown in FIG. 32, the lands 66' may extend to between 90% and 100% of the radius of the head portion.

The nut 60 may include a retaining collar 76 around the internally threaded nut aperture 62 axially offset from the underside 68 of the head portion 64 forming an axial annular engagement groove 74 extending from the lands to the retaining collar 76. The groove 74 is adapted to relieve material of a member on installation of the fastener by receiving material as the lands in the underside of the head portion mechanically interlock with the member.

It is understood that the features described herein with reference to one or more embodiments may be applied in combination with any of the fastener alternatives described and shown with reference to FIGS. 1 through 32 when not conflicting in geometry. For example, the various orientations of the leading side 48 as described with reference to FIGS. 14 and 15, the annular recess 52 as described with reference to FIG. 3, serrations on edge portions of the groove and retaining ring as described with reference to FIGS. 24-26, the various orientations of the face surface as described with reference to FIGS. 9 and 10, FIGS. 11 and 12, and FIGS. 20-23, partial threads 59 as described with reference to FIGS. 27 and 28, and other features as desired, may be applied with any of the fastener alternatives described and shown with reference to FIGS. 1 through 32 when not conflicting in geometry.

While the invention has been illustrated and described in detail in the drawings and foregoing description, the same is to be considered as illustrative and not restrictive in character, it being understood that only preferred embodiments have been shown and described and that all changes and modifications that come within the spirit of the invention are desired to be protected by the appended claims and the equivalents thereof.

What is claimed is:

1. A self-clinching fastener suitable for connection to a member comprising:
   a. a shank portion of a diameter less than a head portion,
   b. the head portion having at least eight lands extending outwardly along the underside of the head portion spaced about the shank, each land having a face surface extending beyond the shank portion to a radius less than or equal to a radius of the head portion, the width of the lands reducing from adjacent the shank portion toward the radius of the head portion to mechanically interlock with a member with which the fastener is engaged when installed, and
   c. an axial annular engagement groove having a diameter larger than the shank portion, the annular engagement groove axially extending from the lands to a retaining collar adjacent the shank portion, the groove adapted to relieve material of a member on installation of the fastener by receiving material as the lands in the underside of the head portion mechanically interlock with the member.

2. The self-clinching fastener suitable for connection to a member as claimed in claim 1 where the lands extend to between 65% and 100% of the radius of the head portion.

3. The self-clinching fastener suitable for connection to a member as claimed in claim 1 where the lands extend to between 75% and 85% of the radius of the head portion.

4. The self-clinching fastener suitable for connection to a member as claimed in claim 1 where the lands extend to between 90% and 100% of the radius of the head portion.

5. The self-clinching fastener suitable for connection to a member as claimed in claim 1 comprising in addition:
   an annular recess on the underside of the head portion from an upper portion of the groove sloping into the head portion, and the face surface of the lands beyond the sloping annular recess being non-sloping adapted to assist in forming material into the groove as the fastener engages the member.

6. The self-clinching fastener suitable for connection to a member as claimed in claim 1 where the land face surfaces are annularly angled to enable leading edge portions of the lands to initially contact material as the fastener engages the member on installation.

7. The self-clinching fastener suitable for connection to a member as claimed in claim 1 further comprising a plurality of partial threads along an inner portion of the groove between the retaining collar and the lands.

8. The self-clinching fastener suitable for connection to a member as claimed in claim 1 where edge portions of the groove and the retaining ring have serrations.

9. A self-clinching fastener suitable for connection to a member comprising:
   a. a shank portion of a diameter less than a head portion,
   b. the head portion having at least eight lands extending outwardly along the underside of the head portion spaced about the shank, each land having a face surface extending beyond the shank portion to a radius less than or equal to a radius of the head portion to mechanically interlock with a member with which the fastener is engaged when installed, each land having an arcuate leading edge extending toward the radius of the head portion angled from a radial plane, and
   c. an axial annular engagement groove having a diameter larger than the shank portion, the annular engagement groove starting at a lower portion of the lands and axially extending below the lands to a retaining collar adjacent the shank portion, the groove adapted to relieve material of a member on installation of the fastener by receiving material as the lands in the underside of the head portion mechanically interlock with the member.

10. The self-clinching fastener suitable for connection to a member as claimed in claim 9 where the shank portion is threaded, and the leading edges of the lands extending toward the radius of the head portion are angled from the radial plane toward the thread loosening direction between 0 and 10 degrees.

11. The self-clinching fastener suitable for connection to a member as claimed in claim 9 where the lands extend to between 65% and 100% of the radius of the head portion.

12. The self-clinching fastener suitable for connection to a member as claimed in claim 9 where the lands extend to between 78% and 85% of the radius of the head portion.

13. The self-clinching fastener suitable for connection to a member as claimed in claim 9 comprising in addition:
   an annular recess on the underside of the head portion from an upper portion of the groove sloping into the head portion, and the face surface of the lands beyond the sloping annular recess being non-sloping adapted to assist in forming material into the groove as the fastener engages the member.

14. The self-clinching fastener suitable for connection to a member as claimed in claim 9 where the land face surfaces are annularly angled to enable leading edge portions of the lands to initially contact material as the fastener engages the member on installation.

15. The self-clinching fastener suitable for connection to a member as claimed in claim 9 further comprising a plurality of partial threads along an inner portion of the groove between the retaining collar and the lands.

16. The self-clinching fastener suitable for connection to a member as claimed in claim 9 where edge portions of the groove and the retaining ring have serrations.

* * * * *